United States Patent
Pantin

(10) Patent No.: US 8,392,479 B1
(45) Date of Patent: Mar. 5, 2013

(54) METHOD AND APPARATUS FOR OPTIMIZING STORAGE SPACE ALLOCATION FOR COMPUTER DATA

(75) Inventor: Ramon Guillermo Pantin, Kirkland, WA (US)

(73) Assignee: Symantec Corporation, Mountain View, CA (US)

(*) Notice: Subject to any disclaimer, the term of this patent is extended or adjusted under 35 U.S.C. 154(b) by 290 days.

(21) Appl. No.: 12/559,397

(22) Filed: Sep. 14, 2009

(51) Int. Cl.
*G06F 17/30* (2006.01)
(52) U.S. Cl. ........ 707/823; 707/824; 707/825; 707/826; 707/827
(58) Field of Classification Search ........... 707/821–827
See application file for complete search history.

(56) References Cited

U.S. PATENT DOCUMENTS

| | | | |
|---|---|---|---|
| 6,374,266 B1* | 4/2002 | Shnelvar | 1/1 |
| 7,107,385 B2* | 9/2006 | Rajan et al. | 711/4 |
| 7,809,917 B2* | 10/2010 | Burton et al. | 711/170 |
| 2005/0246382 A1* | 11/2005 | Edwards | 707/200 |
| 2007/0266037 A1* | 11/2007 | Terry et al. | 707/100 |
| 2008/0307192 A1* | 12/2008 | Sinclair et al. | 711/218 |
| 2010/0174879 A1* | 7/2010 | Pawar et al. | 711/161 |

OTHER PUBLICATIONS

Wikipedia, "Allocate-on-flush", downloaded from web site http://en.wikipedia.org/wiki/Allocate-on-flush on Jan. 18, 2010, 1 page.
Jonathan Corbet, "Better than POSIX?", Mar. 17, 2009, downloaded from web site http://lwn.net/Articles/323752/ on Jan. 18, 2010, pp. 1-35.
Theodore Tso, "Delayed allocation and the zero-length file problem", Mar. 12, 2009, downloaded from web site http://thunk.org/tytso/blog/2009/03/12/delayed-allocation-and-the-zero-length-file-problem/ on Jan. 18, 2010, pp. 1-72.

* cited by examiner

*Primary Examiner* — John E Breene
*Assistant Examiner* — Joshua Bullock
(74) *Attorney, Agent, or Firm* — Campbell Stephenson LLP

(57) ABSTRACT

A method and apparatus for optimizing storage space allocations, using at least one processor, for computer data in distributed file systems is described. In one embodiment, the method includes processing input/output activity that is associated with computer data to determine a current state of at least one file in a distributed file system, at flush time, combining various storage space allocation decisions applied over at least one network protocol to determine a plurality of file system operations that define storage space, based on the current state of the at least one file, for the computer data and executing the plurality of file system operations on the computer data stored in the storage space.

18 Claims, 5 Drawing Sheets

METHOD AND APPARATUS FOR OPTIMIZING STORAGE SPACE ALLOCATION FOR COMPUTER DATA

BACKGROUND OF THE INVENTION

1. Field of the Invention

Embodiments of the present invention generally relate to file system and storage management and, more particularly, to a method and apparatus for managing and optimizing storage space allocation for computer data in disk file systems and distributed file systems.

2. Description of the Related Art

Currently, an operating system temporarily stores input/output activity (e.g., system calls, such as create file, delete file, write data and/or the like) in computer memory (e.g., RAM) until flush time. After each system call, the operating system completes various file data and metadata allocation decisions that define storage space for the computer data. Subsequently, the operating system flushes information regarding storage and/or file system operations that update the file data and metadata in accordance with such storage space allocation decisions. In other words, the one or more operating systems periodically copy the storage and/or file system operations to hard disk.

The hard disk may include computer data (e.g., files and directories) that is organized into a file system, such as File Allocation Table (FAT), New Technology File System (NTFS). Generally, a file system is a method of organizing and storing computer files. The file system may be used to retrieve file data from a plurality of storage devices. For example, the DOS, WINDOWS, OS/2, MACINTOSH and UNIX based operating systems all have file systems in which files are placed somewhere in a hierarchical (tree) structure. A file is placed in a directory (folder in Windows) or subdirectory at the desired place in the tree structure. File systems may use a data storage device, such as a hard disk or CD-ROM, to maintain the physical location of the file data.

The computer data may be organized in accordance with a transactional file system, such as Transactional NTFS. Generally, the computer data in a transactional file system volume is fault-tolerant and consistent. A transaction can either be finished completely (e.g., a committed transaction) or reverted completely (e.g., a rolled back transaction), but not necessarily both at any given point in time. This means that if there is a crash or power failure, after recovery, the storage state of the computer data will be consistent. A significant amount of computing overhead, however, is required to maintain data consistency.

Unfortunately, interaction with certain disk file systems causes a significant amount of random input/output activity that is replete with interdependencies between various storage and/or file system operations. For example, metadata cannot be flushed until log records are finished being written into the log. As another, metadata updates to various bit maps have to be performed in an appropriate order when such metadata updates affect overlapping portions of the computer data. In addition, log-based file systems (e.g., EXT3) do not reclaim storage space after file deletions. Furthermore, metadata may be inconsistent in block-based file systems (e.g., SUN file system, UNIX file system).

Currently, disk file systems and distributed file system allocate storage space (e.g., hard disk space) for file data updates and metadata updates at system call time. For example, when data is written into a file, which causes the file to grow, such file systems determine a portion of a hard disk for the data to reside. Thus, for each and every write operation, a storage space allocation decision is made. Similarly, when other system calls are made (e.g., file or directory creation), the metadata updates are also determined (e.g., directory block allocation decision) at system call time. For example, file creation results in an allocation of an iNode as well as an allocation of a disk block to store a file name and an iNode number within a parent directory data area.

Some file systems journal each and every metadata updates, such that writes to the journal log are done as a result of each one of these file data space and metadata space allocation decisions. Unfortunately, the operating system responds to system calls with immediate space allocation decisions even if one or more files are subsequently deleted. Because the space allocation decisions have already been made, any effects must be undone. For example, one or more additional metadata updates may be journaled to reflect availability of one or more portions of the metadata (e.g., blocks and iNodes that are now free). In order to reduce a number of storage space allocations, current operating systems may implement various optimization tricks. For example, the operating system over allocates storage space at an end of a file with an expectation that future input/output activity (e.g., subsequent writes) consume that over allocated storage space.

Therefore, there is a need in the art for a method and apparatus for optimizing storage space allocations, using at least one processor, for computer data in disk file systems and distributed file systems.

SUMMARY OF THE INVENTION

Embodiments of the present invention generally include a method and apparatus for optimizing storage space allocations, using at least one processor, for computer data in disk and distributed file systems. In one embodiment, the method includes processing input/output activity that is associated with computer data to determine a current state of at least one file in a distributed file system, at flush time, combining storage space allocation decisions applied over at least one distributed network protocol to determine a plurality of file system operations that define storage space, based on the current state of the at least one file, for the computer data and executing the plurality of file system operations to modify the computer data stored in the storage space.

In some embodiments, the storage space that is to be allocated for the input/output activity is reserved. In some embodiments, the input/output activity is transformed into the plurality of file system operations. In some embodiments, a storage space counter is updated in response to the input/output activity, wherein the storage space counter represents an amount of available storage space. In some embodiments, various portions of the input/output activity are batched to produce the plurality of file system operations. In some embodiments, at least one storage space allocation decision that is associated with deleted computer data is removed. In some embodiments, an optimal layout of the storage space is determined for file data updates and metadata updates. In some embodiments, at least one closed file is selected to be flushed to disk. In some embodiments, a plurality of log directory records are coalesced into at least one log directory records, wherein the coalesced at least one log directory record is written to disk sequentially. In some embodiments, the coalesced at least one log directory record is validated. In some embodiments, current state information regarding file data in memory is updated.

In some embodiments, an apparatus for optimizing storage space allocations, using at least one processor, for computer data in distributed file systems, includes for a determination module for processing input/output activity that is associated with computer data to determine a current state of at least one file in a distributed file system at flush time, a combination module for combining storage space allocation decisions applied over at least one distributed network protocol to determine a plurality of file system operations that define the storage space based on the current state of the at least one file at flush time, and an execution module for modifying the computer data stored in the storage space by executing the plurality of file system operations.

In some embodiments, the apparatus further comprises means for transforming the input/output activity into the plurality of file system operations. In some embodiments, the apparatus further comprises means for updating a storage space counter in response to the input/output activity, wherein the storage space counter represents an amount of available storage space. In some embodiments, the apparatus further comprises means for updating current state information regarding file data in memory. In some embodiments, the apparatus further comprises means for removing at least one storage space allocation decision that is associated with deleted computer data. In some embodiments, the apparatus further comprises means for determining an optimal layout of the storage space for file data updates and metadata updates. In some embodiments, the apparatus further comprises means for selecting at least one closed file to be flushed to disk. In some embodiments, the apparatus further comprises means for coalescing a plurality of log directory records into at least one log directory records, wherein the coalesced at least one log directory record is written to disk sequentially.

In some embodiments, a computer-readable-storage medium comprising one or more processor-executable instructions that, when executed by at least one processor, causes the at least one processor to process input/output activity that is associated with computer data to determine a current state of the file data in a distributed file system, wherein the computer data is organized within storage space, combine storage space allocation decisions applied over at least one distributed network protocol at flush time to determine a plurality of file system operations that define the storage space based on the current state of the at least one file and execute the plurality of file system operations on the computer data stored in the storage space.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure refer to a method and apparatus for optimizing storage space allocations for disk file systems and distributed file systems. An operating system may cooperate with various software modules to perform various system calls on computer data at flush time instead of system call time. In some embodiments, a combination module may process input/output activity within a given time period and determine one or more file system operations that modify the computer data while reducing storage space and computational expenses related to the execution of such file system operations. In some embodiments, the combination module may batch together several small write operations into a single large write operation.

Figure 1:
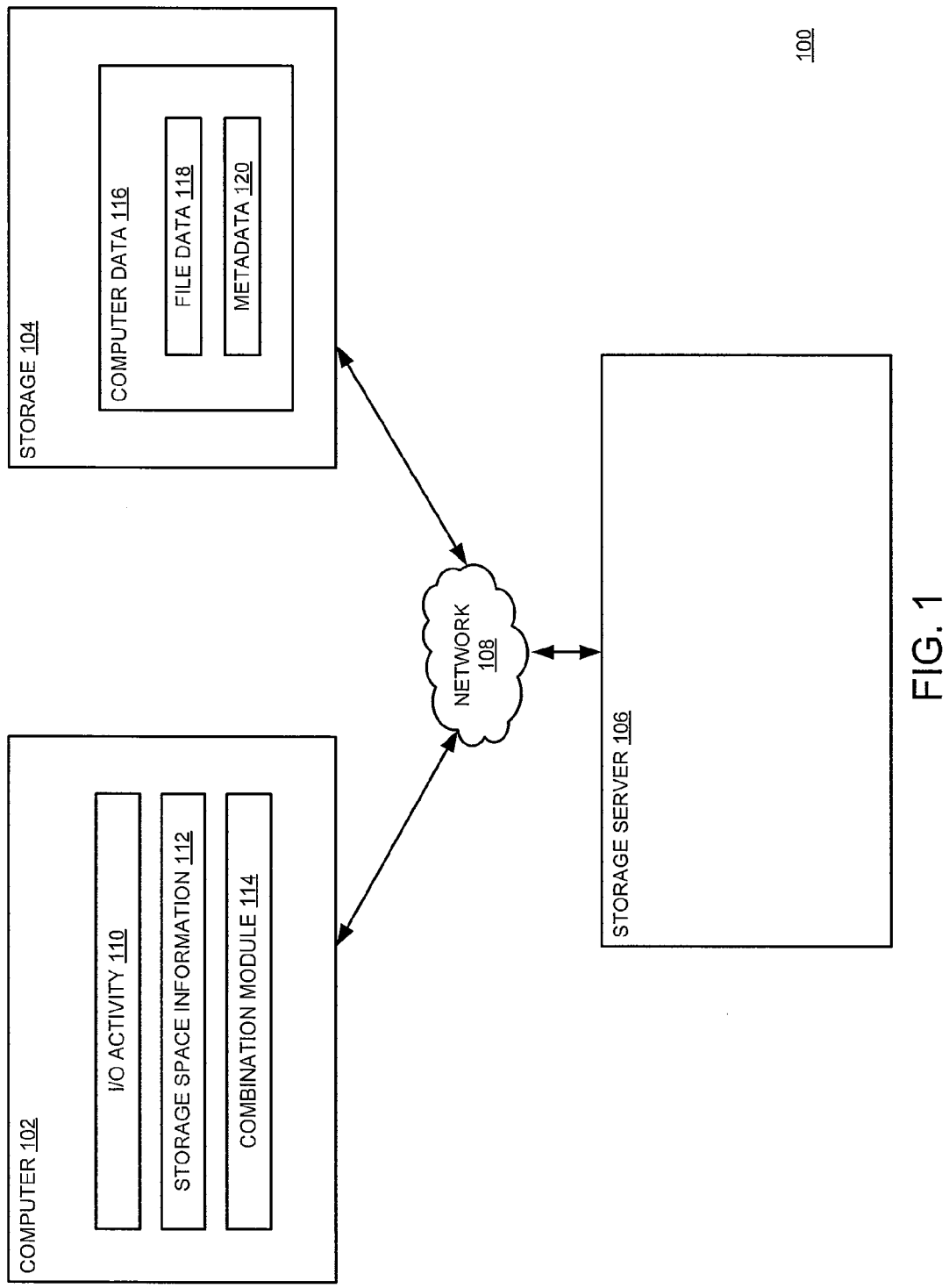
FIG. 1 is a block diagram of a system for optimizing storage space allocations, using at least one processor, for computer data in disk file systems and distributed file systems according to one or more embodiments of the present invention.

FIG. 1 is a block diagram of a system 100 for optimizing storage space allocations, using at least one processor, for computer data in disk file systems and distributed file systems according to one or more embodiments. In one embodiment, the system 100 includes a computer 102, storage 104 and a storage server 106 where each is coupled to each other through a network 108.

The computer 102 may be a type of computing device (e.g., a laptop, a desktop, a Personal Digital Assistant (PDA), a tablet, a mobile phone and the like) as explained further below. The computer 102 includes various data, such as input/output activity 110 and storage space information 112 as well as various software packages, such as a combination module 114.

The storage 104 generally includes various components (i.e., hardware and software) that are configured to manage various storage resources within a computing environment. The storage 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the computer 102. The storage 104 facilitates permanent storage of critical computer data, such as computer data 116.

The computer data 116 further includes file data 118 and metadata 120 and is generally organized in accordance with one or more file systems, such as disk file systems (e.g., ext2, ext3, File Allocation Table (FAT), UNIX File System (UFS) and/or the like) and distributed file systems (e.g., Network File System (NFS), Common Internet File System (CIFS) and/or the like). As such, the computer data 116 includes file data 118 and metadata 120. Furthermore, the computer data 116 may include a journal for recording updates (e.g., metadata updates) in a journaling file system (e.g., VERITAS File System (VFS), ext3 and/or the like).

Operating systems support and interact with a variety of file systems. Specifically, the operating systems utilize drivers and/or special system calls (e.g., functions) in order to interact with the supported file systems. For example, Microsoft Windows NT, 2000 and XP include a default file system Application Programming Interface (API) (i.e., file system drivers) that enable access to storage volumes organized under NTFS, FAT and FAT32 file systems, such as the computer data 116. The computer data 116 may be provided to an application and/or presented to a user through a computer display.

The storage server 106 may be a type of computing device (e.g., a laptop, a desktop and the like) as explained further below. In some embodiments, the storage server 106 may cooperate with the storage 104 to execute file system operations on the file data 118 and/or the metadata 120. In some embodiments, the combination module 114 includes software code (e.g., processor executable instructions) in memory, which may be configured to transform the input/output activity 110 into a plurality of file system operations that optimize storage space allocations for the computer data 116. In some embodiments, the combination module 114 may be executed by a CPU in order to determine one or more file system operations that define the storage space associated with the computer data 116.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand, Internet Small Computer System Interface (iSCSI) and/or the like.

Generally, the input/output activity 110 includes information regarding one or more system calls (e.g., file management functions such as create file (or directory), open file, close file, rename file, delete file, read data, write data and/or the like) associated with the computer data 116. The input/output activity 110 may represent a current state of a particular file (e.g., a file name, file data, parent directory and/or the like) as described in further detail below. If the particular file is deleted prior to flush time, the current state (e.g., the file name, the file data and/or the like) is also removed from the input/output activity 110. Hence, no metadata updates are determined for the deleted particular file at flush time, which optimizes computer resource utilization and minimizes overhead costs.

The input/output activity 110 may indicate an ordering for the one or more system calls (e.g., sequential order). In one embodiment, the one or more system calls may form a transaction. As such, the input/output activity information 124 may include transactional and non-transactional storage and/or file system operations. The input/output activity 110 may be a log file that is periodically copied (i.e., flush time) to the storage space for the computer data 116. For example, the input/output activity 110 may be flushed from RAM to a hard disk (e.g., within the storage 104).

Performance of each system call on the computer data 116 requires one or more storage space allocations to be decided and completed. As described further below, decisions regarding the one or more storage space allocations may be made at flush time. For example, new file creation inherently involve storage space allocations that update the metadata 120 (e.g., a data cluster bitmap update, an iNode allocation, a file control block allocation, a directory block allocation, an iNode update and/or the like) in addition to the file data 118 (e.g., resident and non-resident data attributes for a new MFT record). In one or more embodiments that include classical file systems, each and every metadata storage space allocation may be flushed (e.g., written) to a journal within the storage 104.

The storage space information 112 refers to one or more file system operations that optimize storage space allocations based on the I/O activity 110. In some embodiments, the file system operations define the storage space for the computer data 116. These file system operations may relate to the one or more system calls as indicated by the input/output activity 110. Execution of the file system operations on the computer data 116 updates the file data 118 and/or the metadata 120. In some embodiments, one or more updates to the metadata 120 may inherently result from an update to the file data 118. For example, when a new file is created, metadata (e.g., iNode, MFT record attributes, directory records and/or the like) may be modified and/or added to reflect the new file within a file system. In one embodiment, the one or more file system operations may be flushed to one or more journals, logs or streams on the hard disk.

In one embodiment, the combination module 114 includes software code (e.g., processor executable instructions) for combining various portions of the input/output activity 110 to produce the one or more file system operations. Various storage space allocation decisions for one or more system calls may be batched together at flush time as a result. For instance, several metadata updates may be combined into one or more metadata updates. In another instance, two or more sequential write operations to a particular file may be combined into one write operation. As another example, the combination module 114 omits and/or removes any storage space allocation decision for data (e.g., a temporary file, a data file, a file update, an iNode, a file control block, a MFT record and/or the like) that is written and subsequently deleted between system call time and the flush time.

Optionally, the computer 102 may be delegated with the tasks of a file server that facilitates access to the computer data 116. For example, the computer data 116 may be organized as a distributed file system. Accordingly, the combination module 114 produces one or more log directory records for execution on the computer data 116 and storage on disk (i.e., within the storage 104). Alternatively, the storage server 106 may cooperate with the computer 102 and perform various storage operations that write the one or more log directory records on the storage 104 as explained further below. In a distributed file system, storage space allocations and quotas per user or per user group may be applied over at least one distributed network protocol. For example, the computer communicates a request to the storage server 106 to reserve storage space within the storage 104 on behalf of itself or one or more logged in users.

In another embodiment, when the system 100 utilizes an internal protocol for a client/server structured file system, the computer 102 and the storage server 106 may cooperate to maintain an unflushed state for each and every file system operation within the storage space information 112 even though these file system operations are communicated to a traditional client/server file system structure (e.g. through Remote Procedure Calls (RPCs)). The combination module 114 may instruct the storage server 106 to delay a flush operation over a definable time period because the maintained unfinished state may be reestablished if the storage server 106 restarts (e.g., due to a hardware or software crash/failure).

Figure 2:
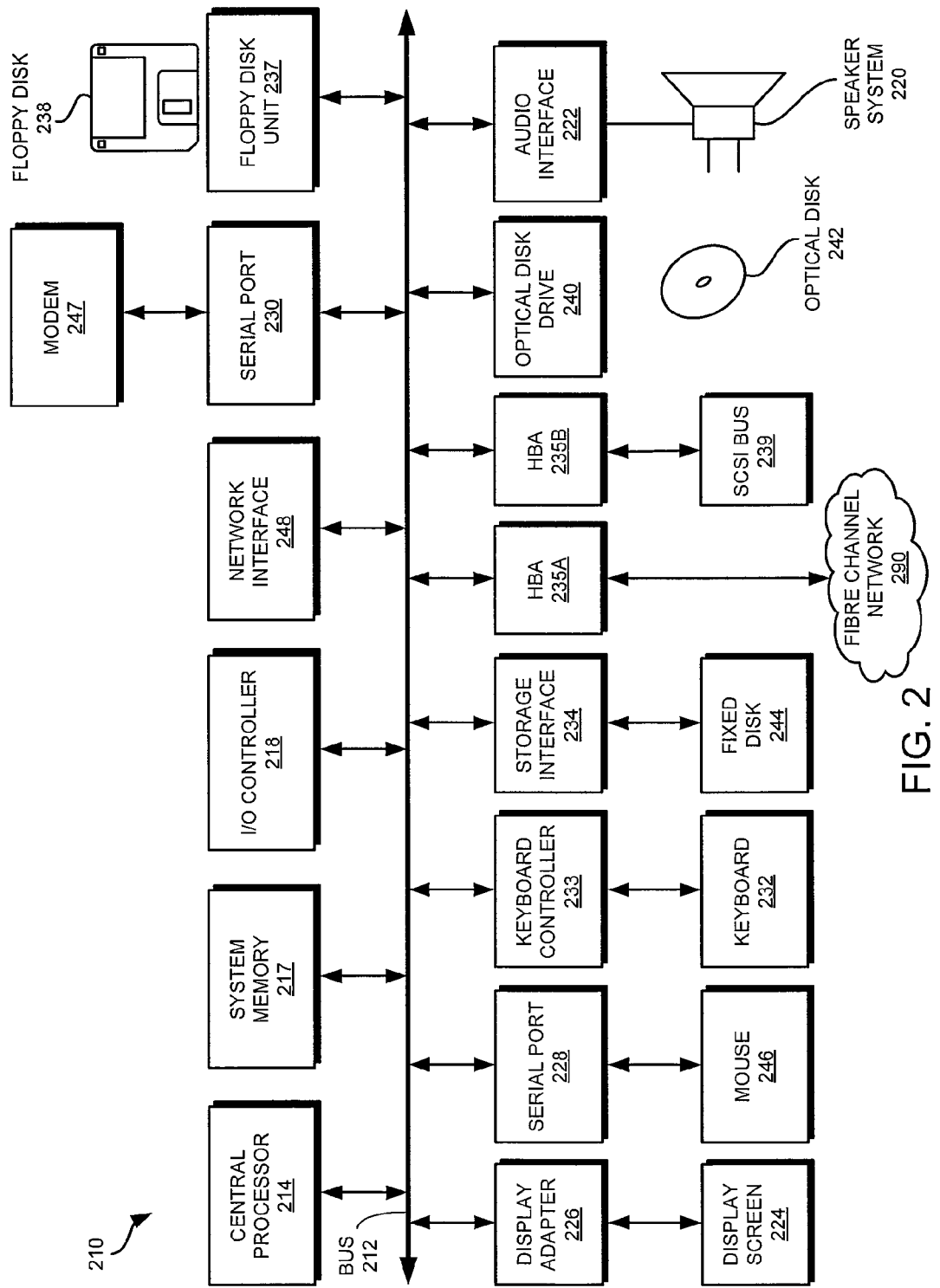
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 104 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
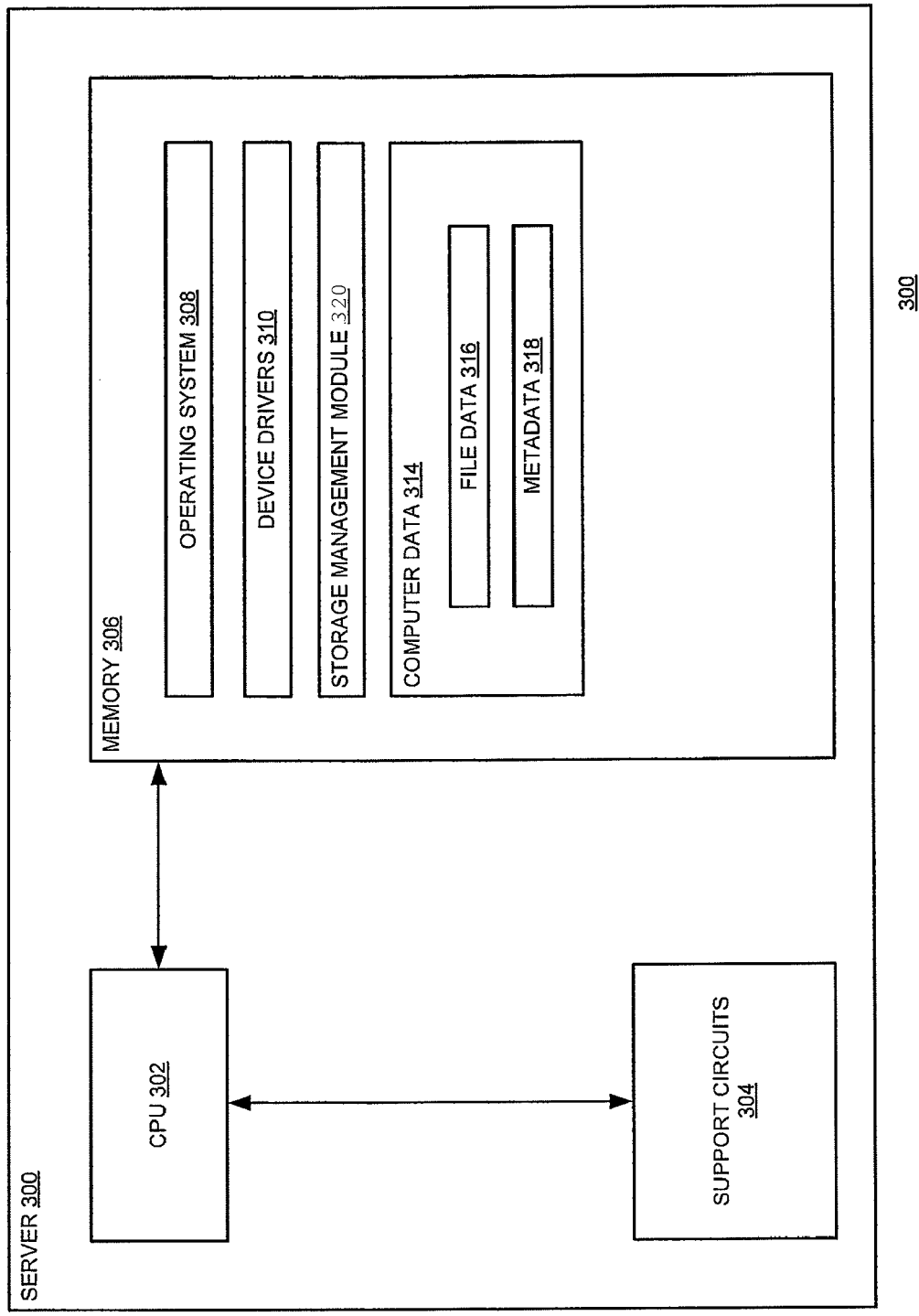
FIG. 3 is a block diagram of server for optimizing storage space allocations, using at least one processor, for computer data in disk file systems and distributed file systems according to one or more embodiments of the present invention.

FIG. 3 is a block diagram of a server for optimizing storage space allocations, using at least one processor, for computer data in disk file systems and distributed file systems according to one or more embodiments of the present invention;

The server 300 is a type of computing device (e.g., a laptop, a desktop, a Personal Digital Assistant (PDA), a tablet and the like) that comprises a central processing unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308 and device drivers 310. The memory 306 further includes various data, such as computer data 314, which further includes file data 316 and metadata 318. The memory 306 further includes various software packages, such as a storage management module 320.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

In some embodiments, the storage management module 320 includes software code (e.g., processor executable instructions) for performing various storage operations on one or more data storage devices (e.g., a hard disk, a LUN configuration and/or the like). As explained in further detail below, a combination module (e.g., the combination module 114 of FIG. 1) may instruct the storage management module 320 to reserve and/or allocate various portions of the storage space within the memory 306. Furthermore, the storage management module 320 may be instructed to write data to the file data 316 and/or the metadata 318 during execution of one or more optimized file system operations by an execution module (e.g., the execution module 420 of FIG. 4).

In some embodiments, the computer (e.g., the computer 102 of FIG. 1) may function as a file server that manages access to the computer data 116. The computer data 116 may be organized as a disk or a distributed file system as explained further below. Accordingly, the combination module produces one or more log directory records for application on the computer data 116. The storage management module 320 may perform various storage operations in order to write the one or more log directory records on the one or more storage devices (e.g., the storage 104 of FIG. 1). The storage management module 320 may perform a validation process on any untrusted log directory record. As a trusted system, the server 106 is configured to determine whether a particular untrusted log directory record are well-formed and devoid of malicious metadata and/or erroneous ownership data (e.g., correct user IDs or SIDs, absence of set-user/group-ID or any other access privilege mechanism that may be used to circumvent a security system and/or the like).

In a distributed file system where the computer (e.g., the computer 102 of FIG. 1) performs a file server role, allocations of storage space (e.g., hard disk space) for the computer data 314 and quotas per user or per user group may be applied over at least one distributed network protocol. For example, the computer communicates a request to the storage management module 320 to reserve storage space (e.g., within the storage 104 of FIG. 1) on behalf of itself or one or more logged in users. As a result, various errors (e.g., out of space, out of file and/or storage space quota condition errors) may be returned reliably at flush time instead after each system call. Thus, through delegation of various quotas (e.g., storage space, file count and/or the like quotas), the combination module may omit communicating Remote Procedure Calls (RPC) to the storage management module 320 per system call. Instead, the combination module may communicate RPCs after a particular number of system calls or at flush time. Furthermore, the storage server 106 utilizes revoke/recall callbacks in order to properly handle one or more competing requests that affect storage space reservations associated with the computer data 314.

In one or more embodiments that employ an internal protocol for a client/server structured file system, the computer and the server 300 may cooperate to maintain an unflushed state for each and every file system operation within the storage space information even though these file system operations are communicated to a traditional client/server file system structure (e.g. through Remote Procedure Calls (RPCs)). The combination module may instruct the storage management module 320 to delay a flush operation over a definable time period because the maintained unfinished state may be reestablished if the server 300 restarts (e.g., due to a hardware or software crash/failure).

Figure 4:
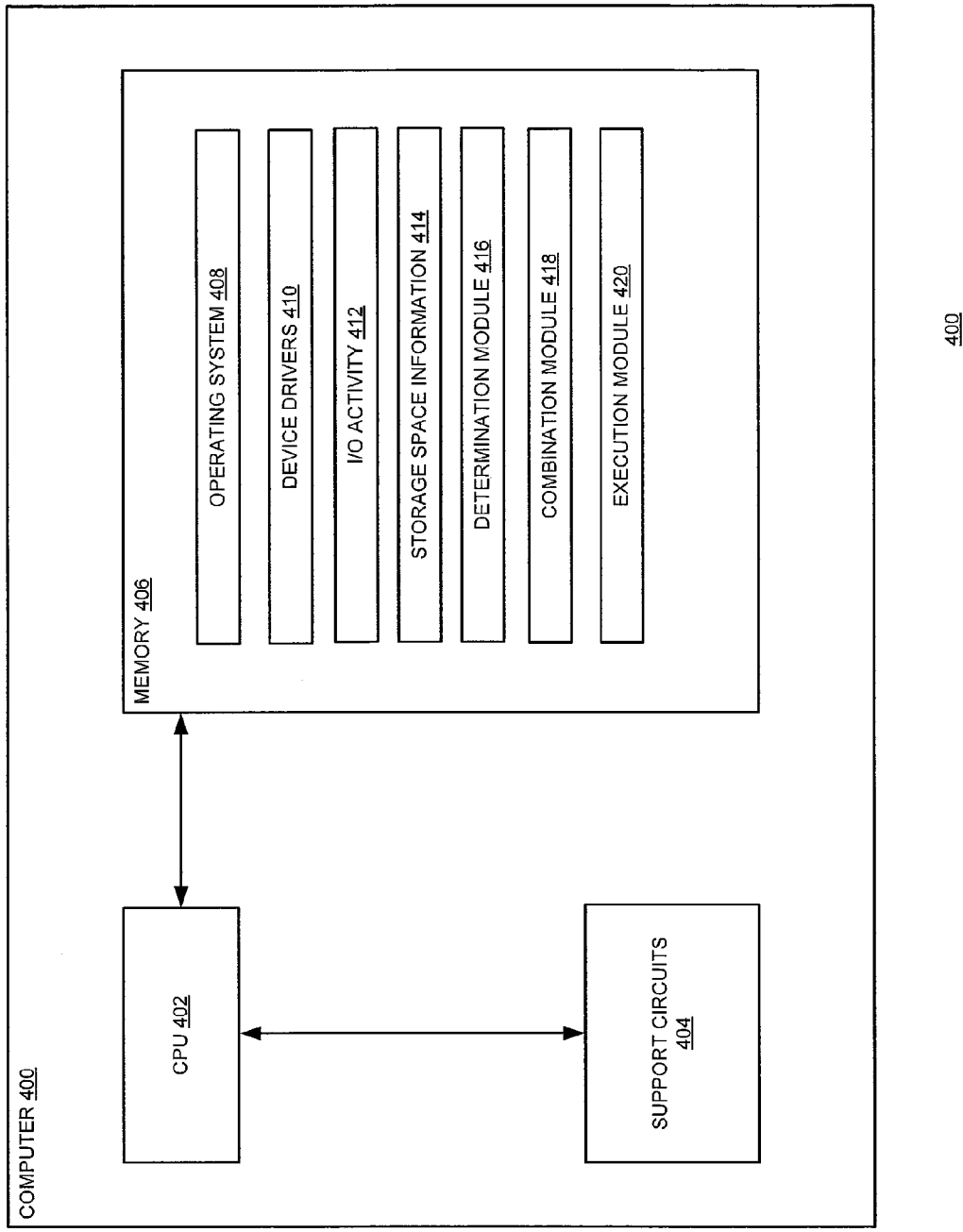
FIG. 4 is a block diagram of a computer for optimizing storage space allocations, using at least one processor, for computer data in disk file systems and distributed file systems according to one or more embodiments of the present invention.

FIG. 4 is a block diagram of a computer 400 for optimizing storage space allocations, using at least one processor, for computer data in disk file systems and distributed file systems according to one or more embodiments of the present invention.

In some embodiments, the computer 400 is a type of computing device (e.g., a laptop, a desktop, a Personal Digital Assistant (PDA), a tablet, a mobile phone and the like) that comprises a central processing unit (CPU) 402, various support circuits 404 and a memory 406. The CPU 402 may comprise one or more commercially available microprocessors or microcontrollers that facilitate data processing and storage. The various support circuits 404 facilitate operation of the CPU 402 and may include clock circuits, buses, power supplies, input/output circuits and/or the like. The memory 406 includes a read only memory (ROM), random access memory (RAM), disk drive storage, optical storage, removable storage, and the like. The memory 406 includes an operating system 408 and device drivers 410. The memory 406 also includes various data, such as input/output activity 412 and storage space information 414. The memory 406 further includes various software packages, such as a determination module 416, a combination module 418 and an execution module 420.

The operating system 408 generally manages various computer resources (e.g., network resources, data storage resources, file system resources and/or the like). The operating system 408 is configured to execute operations on one or more hardware and/or software components, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the device drivers 410 to execute various file system and/or storage operations. As an example, the operating system 408 may utilize a device driver associated with a NIC card to communicate data to another computer as explained further below.

As described in the present disclosure, the input/output activity 412 includes information regarding one or more system calls (e.g., file management functions such as create file (or directory), open file, close file, rename file, delete file, read data, write data and/or the like) associated with computer data (e.g., the computer data 116 of FIG. 1 and/or the computer data 314 of FIG. 3). The input/output activity 412 may indicate an ordering for the one or more system calls (e.g., sequential order). In one embodiment, the one or more system calls may form a transaction. As such, the input/output activity information 412 may include transactional and non-transactional storage and/or file system operations. The input/output activity 412 may be a log file that is periodically copied (i.e., flush time) to the storage space for the computer data. For example, the input/output activity 412 may be flushed from RAM (e.g., the memory 406) to a hard disk (e.g., within the storage 104 of FIG. 1).

According to one or more embodiments, the input/output activity 412 includes information regarding one or more files that are created and/or updated as a result of the one or more system calls. The input/output activity 412 may represent a current state of a particular file (e.g., a file name, file data, parent directory and/or the like). If the particular file is deleted prior to flush time, the current state (e.g., the file name, the file data and/or the like) is also removed from the input/output activity 412. Hence, no metadata updates are determined for the deleted particular file at flush time, which optimizes computer resource utilization and minimizes overhead costs.

Performance of each system call on the computer data requires one or more storage space allocations to be decided and completed. As described further below, decisions regarding the one or more storage space allocations are made at flush time. For example, creation of a new file inherently involves storage space allocations that update metadata (e.g., the metadata 120 of FIG. 1, such as a data cluster bitmap update, an iNode allocation, a file control block allocation, a directory block allocation, an iNode update and/or the like) in addition to file data (e.g., the file data 118 of FIG. 1, such as resident and non-resident data attributes for a new MFT record). In one or more embodiments that include classical file systems, each and every metadata storage space allocation may be flushed (e.g., written) to a journal within the hard disk or LUN (e.g., the storage 104 of FIG. 1).

The storage space information 414 refers to one or more file system operations that optimize storage space allocations based on the I/O activity 412. In one embodiment, the file system operations define the storage space for the computer data. These file system operations may relate to one or more system calls as indicated by the input/output activity 412. Application of the file system operations on the computer data 116 causes various updates to the file data and/or the metadata. Moreover, one or more updates to the metadata may inherently result from an update to the file data. For example, when a new file is created, metadata (e.g., iNode, MFT record attributes, directory records and/or the like) may be modified and/or added to reflect the new file within a file system. In one embodiment, the one or more file system operations may be flushed to one or more journals, logs or streams on the hard disk.

In some embodiments, the combination module 418 includes software code (e.g., processor executable instructions) in the memory 406, which may be configured to transform the input/output activity 412 into a plurality of file system operations that optimize storage space allocations for the computer data. In some embodiments, the combination module 418 may be executed by the CPU 402 in order to determine one or more file system operations that define the storage space associated with the computer data.

In one embodiment, the combination module 418 combines various portions of the input/output activity 412 to produce the one or more file system operations. Various storage space allocation decisions for one or more system calls may be batched together at flush time. For instance, several metadata updates may be combined into one or more metadata updates. In another instance, two or more sequential write operations to a particular file may be combined into one write operation. As another example, the combination module 418 omits and/or removes any storage space allocation decision for data (e.g., a temporary file, a data file, a file update, an iNode, a file control block, a MFT record and/or the like) that is written and subsequently deleted between system call time and the flush time.

In one or more embodiments, the combination module 418 removes various portions (e.g., system calls for creating temporary files) of the input/output activity 412 to optimize storage space allocations for the computer data. In one embodiment, the combination module 418 removes a deleted file from the storage space information 414 as well as any information that represents a current state of the deleted file. For example, a file may be created and then, deleted prior to flush time. Hence, the combination module 418 does not produce any file system operations that allocate portions of the storage space for the deleted file. In other words, the execution module 420 does not execute any write operations to the metadata (e.g., new iNodes, cluster map updates and/or the like) and/or the file data (e.g., new log directory records, new MFT records and/or the like) for the deleted file. In some embodiments, the execution module 420 does not execute any write operations to a journal (e.g., metadata writes to a journal in a classical disk file system) and/or a log (e.g., log directory records in a log-based file system).

For example, the input/output activity 412 may indicate a file load burst where numerous files are created in a very short time period (e.g., from a software installation, patch or update). The input/output activity 412 may indicate a pause before another file load burst. As such, the input/output activity 412 may indicate multiple file load bursts between system call time and flush time. At flush time, the combination module 418 produces files system operations that complete each and every storage allocation decision (e.g., metadata update) for the new files. Hence, the multiple file load bursts result in one or more large sequential write operations, which may be executed in parallel without sequencing between various file system operations. Because the one or more large sequential write operations are devoid of interdependencies, random input/output activity is removed.

As mentioned in the present disclosure, the computer 400 may be delegated as a file server that facilitates access to a distributed file system that includes the file data and the metadata. Accordingly, the combination module 418 produces one or more log directory records for application on the computer data 116 and storage on disk (i.e., within the storage 104). Alternatively, a server (e.g., the storage server 106 of FIG. 1 and/or the server 300 of FIG. 3) may perform various storage operations in order to write the one or more log directory records (e.g., to the storage 104 of FIG. 1).

In yet another embodiment, the combination module 418 may copy one or more files to disk at flush time and retain other files for a certain time period (e.g., next flush time). For example, the combination module 418 selects closed files because such files are not likely to be changed shortly thereafter. On the other hand, the combination module 418 prevents recently created/updated files that remain open from being flushed because there is a high likelihood of future input/output activity (e.g., subsequent system calls) for such files.

At flush time, the combination module 418 instructs the execution module 420 to nest one or more small files within a parent directory data area (e.g., data attribute for parent directory MFT record) according to one embodiment. In one embodiment, the one or more small files are less than a size of MFT record (1024 bytes or one cluster)). In some embodiments, the combination module 418 instructs the execution module 420 to nest one or more small directories within the parent directory data area. By nesting the small files and/or small directories, the combination module 418 reduces non-resident portions of the file data (e.g., the file data 118 of FIG. 1).

In some embodiments, a particular file (i.e., a large file) may exceed a size limit of a parent directory data area and thus, cannot be nested. As a result, the execution module writes particular file to a separate data area of the storage space (e.g., non-resident data in a MFT) within a hard disk (e.g., the storage 104 of FIG. 1). Future I/O activity may update (e.g., delete, overwrite and/or extend) data within the particular file. The combination module 418 performs these updates logically within the memory 406, which are reflected in the storage space information 414. Hence, the file data and/or the metadata on the hard disk are not affected until flush time. Furthermore, the combination module 418 does not perform any storage space allocation decisions for extensions to the metadata until flush time.

If the computer data maintains points-in-time or implements copy-on-write features for the file data, the combination module 418 may create a new file in the storage space information 414 that represents the future I/O activity along with a mapping between one or more locations in the file data and each update to the particular file according to some embodiments. For example, the new file may be written to an extensible portion of the metadata that is associated with the particular file. In one embodiment, the combination module 418 repeats the creation of such new files that capture the future input/output activity. Thus, a series of these new files may be used to support points-in-time, copy-on-writes, block incremental backups and the like while completing each and every storage space allocation decisions at flush time. Accordingly, the combination module 418 converts a number of random input/output activity into fewer, larger sequential file system operations that may be applied in parallel when initiated at the flush time.

Furthermore, the combination module 418 may configure one or more sequential file system operations to be executed in entirety using a logid associated with one or more log directory records. In other words, the combination module 418 may implement an "all or nothing" approach to large sequential file system operations. After each and every large sequential file system operation is applied, a single, dependent write is performed to a journal to indicate that the one or more log directory records are valid by including corresponding logids. As a result, the combination module 418 may perform each and every storage space allocation decision at flush time correctly and maintain point-in-time consistency for the computer data despite disruptions from hardware or software failures/crashes and any subsequent recovery period.

In one or more embodiments that include a synchronous system call heavy application, an O_DSYNC application or a file server (e.g., a NFS server), the combination module 418 minimizes a number of resulting log directory records. For example, if the input/output activity 412 indicates a sudden burst of new files, the combination module 418 may delay completion of one or more system call related operations (e.g., vnode operations in a UNIX system, I/O Request Processing (IRPs) in MICROSOFT Windows and/or the like) for a definable time period. After a certain number of system calls or the definable time period elapses, one or more operations are performed on the computer data (e.g., a 'flush' operation implied by the O_DSYNC application writes, one or more metadata creation/deletion operations implied by a file server (e.g., NFS, CIFS and/or the like) and require to be committed when a file system operation returns to server code).

In some embodiments, the combination module 418 coalesces several log directory records into a fewer number of log directory records, which are stored in a log directory in the computer data. Because a total number of log directory records may be reduced, the log directory requires less storage space and file system performance improves. In effect, a garbage collection process occurs in a most recently updated end of the log directory instead of a start of the log directory.

In some embodiments that utilize an internal protocol for a client/server structured file system, the computer 400 and the storage server may cooperate to maintain an unflushed state for each and every file system operation within the storage space information 414 even though these file system operations are communicated to a traditional client/server file system structure (e.g. through Remote Procedure Calls (RPCs)). The combination module 418 may instruct the storage server to delay a flush operation over a definable time period because the maintained unfinished state may be reestablished if the storage server restarts (e.g., due to a hardware or software crash/failure).

In a distributed file system where the computer 400 performs a file server role, storage space (e.g., hard disk space) allocations and quotas per user or per user group may be applied over at least one distributed network protocol. For example, the computer 400 may communicate a request to the storage server to reserve storage space on behalf of itself or one or more logged in users. As a result, various errors (e.g., out of space, out of file and/or storage space quota condition errors) may be returned reliably at flush time instead after each system call. Thus, through delegation of various quotas (e.g., storage space, file count and/or the like quotas), the combination module 418 may omit communicating Remote Procedure Calls (RPC) to the storage server 106 per system call. Instead, the combination module 418 may communicate RPCs after a particular number of system calls or at flush time. Furthermore, the storage server utilizes revoke/recall callbacks in order to properly handle one or more competing requests that affect storage space reservations associated with the computer data.

Figure 5:
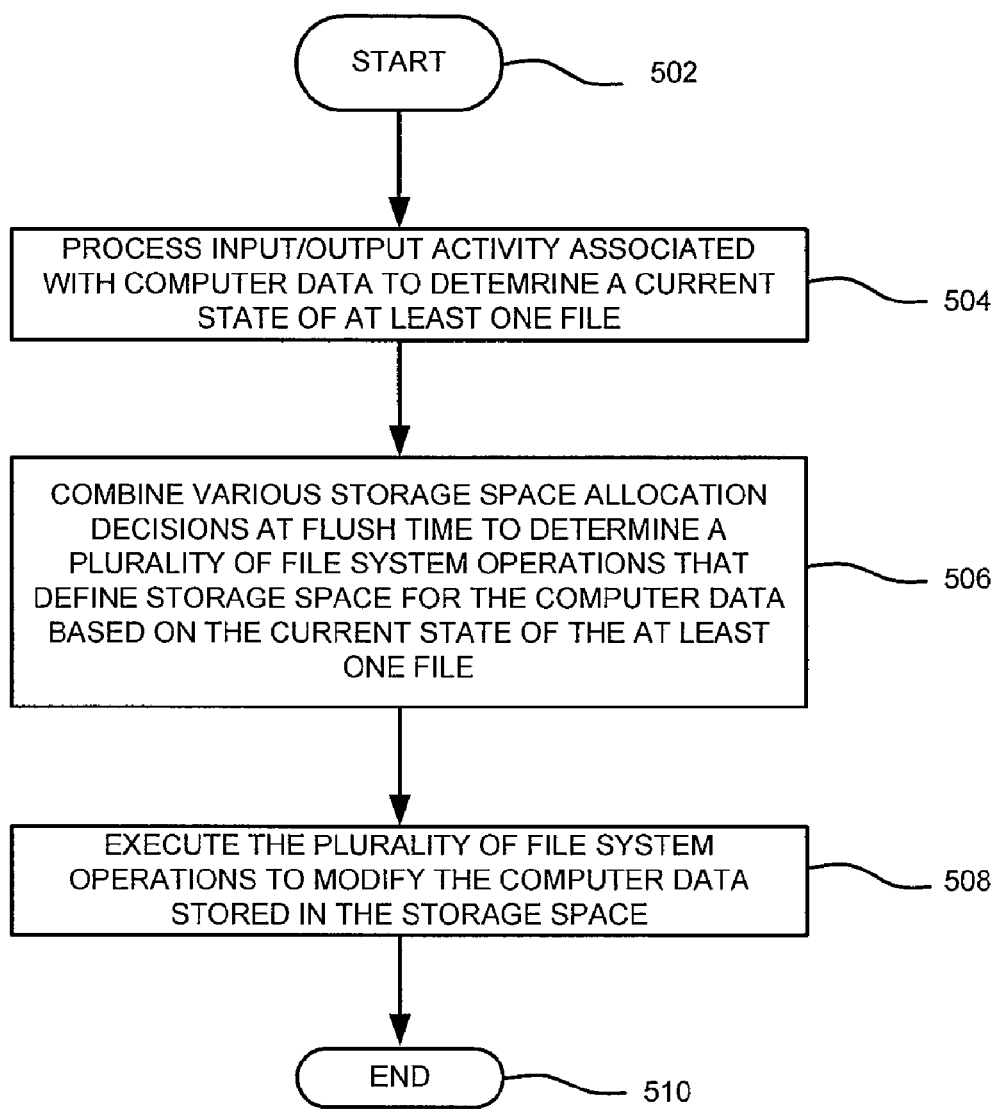
FIG. 5 is a flow diagram of a method for optimizing storage space allocations for computer data in disk file systems and distributed file systems according to one or more embodiments of the present invention.

FIG. 5 is a flow diagram of a method 500 for optimizing storage space allocations, using at least one processor, for disk-based and distributed file systems according to one or more embodiments. The method 500 starts at step 502 and proceeds to step 504.

At step 504, input/output activity that is associated with computer data is processed in order to determine a current state of at least one file. In some embodiments, a determination module (e.g., the determination module 416 of FIG. 4) is executed by one or more processors to process one or more system calls, which may be initiated by various software programs. For example, a software program undergoing an installation process will require a plurality of temporary files to be created. Accordingly, the determination module records the one or more system calls in the input/output activity. The at least one file can be part of a distributed file system.

The input/output activity may include system calls for creating one or more files. In some embodiments, the determination module updates storage space information (e.g., the storage space information 112 of FIG. 1) in memory (e.g., the memory 406 of FIG. 4) to reflect a current state of the one or more files. For example, the storage space information may indicate a file control block allocation for each open file of the one or more files. As another example, the storage space information may indicate metadata updates for the one or more files. Based on the storage space information, a particular amount of storage space on disk (e.g., the storage 104) may be reserved for the input/output activity.

The input/output activity may include system calls for creating one or more files. In some embodiments, the determination module updates storage space information (e.g., the storage space information 116 of FIG. 1) in memory (e.g., the memory 406 of FIG. 1) to reflect a current state of the one or more files. For example, the storage space information may indicate a file control block allocation for each open file of the one or more files. As another example, the storage space information may indicate metadata updates for the one or more files. Based on the storage space information, a particular amount of storage space on disk (e.g., the storage 104) may be reserved for the input/output activity.

In some embodiments, the determination module updates the storage space information to maintain a current state of file data in memory. For example, the determination module may process a create file system. If the system call is a create file system call, the determination module logically creates a file in the memory. In some embodiments, the determination module increases a storage space counter. For example, the storage space counter may be incremented by a size of the file (in bytes). If the storage space counter exceeds an amount of available storage space, the determination module communicates an error message. If the storage space counter does not exceed the amount of available storage space, the determination module updates a current state of the file.

If the system call updates the file in memory (e.g., write data to the file, delete data from the file and/or the like), the determination module logically update the file and adjusts the storage space counter. For example, the storage space counter may be adjusted by a size (in bytes) of data written to the file or deleted from the file. If the storage space counter exceeds the amount of available storage space, the determination module communicates an error message. If the storage space counter does not exceed the amount of available storage space, the determination module proceeds to update a current state of the file. If the system call is a delete file system call, the determination module deletes the file in the memory and decreases a storage space counter. For example, the storage space counter may be decremented by a size (in bytes) of the deleted file.

At step 506, various storage space allocation decisions for the input/output activity are combined at flush time to determine a plurality of file system operations that define storage space, based on the current state of the at least one file, for the computer data. In some embodiments, an operating system may define the flush time for the input/output activity. In some embodiments, the determination module and a combination module (e.g., the combination module 418 of FIG. 4 and/or the combination module 114 of FIG. 1) may cooperate to transform the input/output activity into the plurality of file system operations that define the storage space for metadata updates and/or file data updates as explained further below. For example, the combination module may batch a plurality of write operations to a particular file into one or more large write operations. The combination module stores the one or more file system operations in the storage space information. In some embodiments having a distributed file system, the storage space allocation decisions are applied over at least one distributed network protocol, as discussed above.

In some embodiments, the combination module determines an optimal layout for performance of the storage space allocation decisions. In some embodiments, the combination module may nest several small files as resident data in a Master File Table instead of non-resident data. In some embodiments, the combination module removes storage space allocation decisions associated with deleted file data and/or metadata. In some embodiments, the combination module may delete system calls for creating and, subsequently, deleting temporary files. The combination module does not determine any file system operations for these deleted temporary files as a result. In some embodiments, the combination module may remove, from the storage space information in the memory (e.g., the memory 406), current states of these deleted temporary files.

At step 508, the plurality of file system operations to modify the computer data stored in the storage space are executed. In some embodiments, the execution module recalls instructions of a storage management module (e.g., the storage management module 320 of FIG. 3) to execute the plurality of file system operations on the storage space at the flush time. In some embodiments, the execution module invokes various operating system functions to execute the plurality of file system operations. In some embodiments, the execution module copies the one or more file system operations to the disk. In some embodiments, the execution module copies the one or more file system operations to a log file associated with a log-based file system. In some embodiments, the execution module copies each and every file system operation related to metadata updates into a journal that corresponds with a classical file system. At step 510, the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method comprising:
processing input/output activity that is associated with computer data to determine a current state of at least one file in a distributed file system, wherein the input/output activity represents information regarding one or more system calls, and
each of the one or more system calls results in a storage space allocation decision;
at flush time, determining a plurality of file system operations that define storage space for the computer data, based on the current state of the at least one file, wherein the determining comprises
generating combined storage space allocations by combining the storage space allocation decisions, wherein the combining reduces a total number of storage space allocations to be made, and
transforming the combined storage space allocation decisions into the plurality of file system operations that define the storage space; and
executing the plurality of file system operations to modify the computer data stored in the storage space.

2. The method of claim 1, wherein the processing the input/output activity further comprises:
reserving the storage space that is to be allocated for the input/output activity.

3. The method of claim 1, wherein the determining the plurality of file system operations further comprises:
updating a storage space counter in response to the input/output activity, wherein the storage space counter represents an amount of available storage space.

4. The method of claim 1, wherein the determining the plurality of file system operations further comprises:
batching various portions of the input/output activity to produce the plurality of file system operations.

5. The method of claim 1, wherein the determining the plurality of file system operations further comprises:
removing at least one storage space allocation decision that is associated with deleted computer data.

6. The method of claim 1, wherein the determining the plurality of file system operations further comprises:
determining an optimal layout of the storage space for file data updates and metadata updates.

7. The method of claim 1, wherein the determining the plurality of file system operations further comprises:
selecting at least one closed file to be flushed to disk.

8. The method of claim 1, wherein the determining the plurality of file system operations further comprises:
coalescing a plurality of log directory records into at least one log directory record, wherein the at least one log directory record is written to disk sequentially.

9. The method of claim 8, further comprising: validating the at least one log directory record.

10. The method of claim 1, wherein the processing the input/output activity further comprises:
   updating current state information regarding file data in memory.

11. An apparatus comprising:
   a processor;
   a determination module for processing input/output activity that is associated with computer data to determine a current state of at least one file in a distributed file system, wherein the input/output activity represents information regarding one or more system calls, and each of the one or more system calls results in a storage space allocation decision:
   a combination module for determining a plurality of file system operations that define storage space for the computer data, based on the current state of the at least one file, at flush time,
   wherein the combination module is further for generating combined storage space allocation decisions by combining the storage space allocation decisions, wherein the combining reduces a total number of storage space allocations to be made, and transforming the combined storage space allocation decisions into the plurality of file system operations that define the storage space; and
   an execution module for modifying the computer data stored in the storage space by executing the plurality of file system operations.

12. The apparatus of claim 11, further comprising:
   means for updating a storage space counter in response to the input/output activity, wherein the storage space counter represents an amount of available storage space.

13. The apparatus of claim 11, further comprising:
   means for updating current state information regarding file data in memory.

14. The apparatus of claim 11, further comprising:
   means for removing at least one storage space allocation decision that is associated with deleted computer data.

15. The apparatus of claim 11, further comprising:
   means for determining an optimal layout of the storage space for file data updates and metadata updates.

16. The apparatus of claim 11, further comprising:
   means for selecting at least one closed file to be flushed to disk.

17. The apparatus of claim 11, further comprising:
   means for coalescing a plurality of log directory records into at least one log directory record, wherein the at least one log directory record is written to disk sequentially.

18. A non-transitory computer-readable-storage medium comprising one or more processor-executable instructions that, when executed by at least one processor, causes the at least one processor to:
   process input/output activity that is associated with computer data to determine a current state of at least one file in a distributed file system, wherein the computer data is organized within storage space, the input/output activity represents information regarding one or more system calls, and each of the one or more system calls results in a storage space allocation decision:
   determine a plurality of file system operations that define the storage space, at flush time, based on the current state of the at least one file, wherein the determining further causes the at least one processor to
   generate combined storage space allocation decisions by combining the storage space allocation decisions, wherein the storage space allocation decisions are combined to reduce a total number of storage space allocations to be made, and
   transform the combined storage space allocation decisions into the plurality of file system operations that define the storage space; and
   execute the plurality of file system operations on the computer data stored in the storage space.

* * * * *